Aug. 30, 1966   R. M. BERGSTEIN ETAL   3,269,635
CANISTER TYPE PAPERBOARD CARTONS

Filed Jan. 4, 1965   4 Sheets-Sheet 1

INVENTOR.
ROBERT M. BERGSTEIN AND
ROBERT W. NERENBERG,
BY
ATTORNEYS

Aug. 30, 1966  R. M. BERGSTEIN ETAL  3,269,635
CANISTER TYPE PAPERBOARD CARTONS

Filed Jan. 4, 1965  4 Sheets-Sheet 2

INVENTOR.
ROBERT M. BERGSTEIN AND
ROBERT W. NERENBERG,
BY
ATTORNEYS.

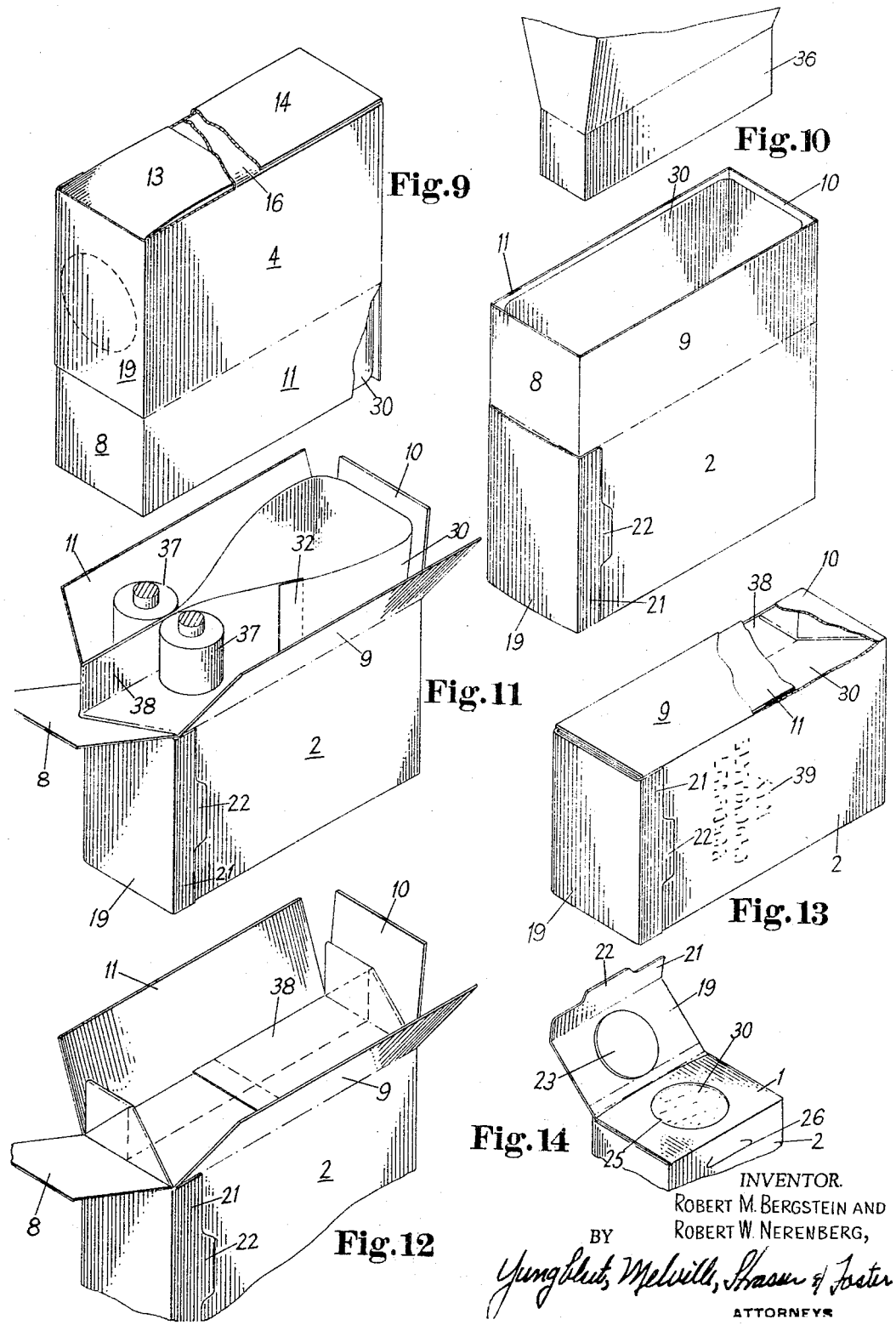

INVENTORS
ROBERT M. BERGSTEIN AND
ROBERT W. NERENBERG,
BY
ATTORNEYS.

United States Patent Office 3,269,635
Patented August 30, 1966

3,269,635
CANISTER TYPE PAPERBOARD CARTONS
Robert M. Bergstein, Wyoming, and Robert W. Nerenberg, Middletown, Ohio, assignors to Bergstein Packaging Trust, Middletown, Ohio, a trust composed of Robert M. Bergstein and Frank D. Bergstein, trustees
Filed Jan. 4, 1965, Ser. No. 425,108
6 Claims. (Cl. 229—14)

This invention has to do with folding paperboard cartons and relates more particularly to a lined folding carton having many of the attributes of a conventional canister type container. This application is a continuation-in-part of co-pending application Serial No. 285,405 filed June 4, 1963, now abandoned and entitled, Canister Type Paperboard Carton.

The expression canister type container refers to that class of containers which has a tubular body, usually fiberboard, closed at its ends by metal or plastic end walls crimped to the ends of the tubular body, with one of the end members having a relatively large dispensing opening therein closed by a metal or plastic lid friction fitted in the opening. Such canisters find widespread usage in the packaging of powdered and granular materials which are dispensed with a spoon; and consequently the opening in the top end of the canister is usually of a size to readily receive either a teaspoon or a tablespoon. While convenient for the ultimate user, a canister type container represents added expense to the packager and, in many instances, does not adequately proof the contents against the exchange of moisture and vapor during shipment and initial storage.

Accordingly, a principal object of the instant invention is the provision of lined folding cartons which have many of the attributes of a canister type container and yet is less expensive to make and at the same time will more adequately protect the contents of the package.

Another object of the instant invention is the provision of folding cartons having a tubular body with closure flaps defining an opposite part of the carton walls but, unlike a conventional carton structure wherein the closure flaps define the top and bottom walls, the orientation of the parts is such that the closure flaps define opposite side walls of the carton in its ultimate position of use with one of the tubular body walls defining the top wall of the carton and having the dispensing opening formed therein, which opening is covered by an integral liftable flap.

Another object of the invention is the provision of folding cartons of the character described having tubular liners therein in which the orientation of the liner relative to the walls of the surrounding carton is such that an unseamed portion of the liner body is juxtaposed to the body wall of the carton which ultimately serves as the top wall of the structure and has the dispensing opening formed therein, the arrangement of parts being such that when the closure flap overlying the dispensing opening is raised, the tubular liner will be exposed through the dispensing opening so that the liner may be severed about the periphery of the opening to provide access to the contents of the package.

Still another object of the invention is the provision of lined carton structures of the character described in which the unseamed portion of the liner which underlies the dispensing opening is adhered to the carton body wall around the periphery of the opening so as to provide what might be deemed a drumhead effect, the liner being held taut and hence easily severed without sagging when the initial cut or puncture is made.

A further object of the invention is the provision of a lined carton structure of the character described wherein the dispensing opening is closed by a separate cover member formed from a flexible material, preferably plastic, adapted to be received and retained in the dispensing opening, the cover member by reason of its flexibility conforming to the contour of the top wall, the cover being provided with spaced apart lugs positioned to engage beneath the cut edges of the dispensing opening so as to lock the cover in place.

Yet a further object of the invention is the provision of a lined carton structure of the character described wherein the dispensing opening in the carton is defined by a removable plug which, when the carton is initially formed, is adhered to the inner surface of the overlying liftable closure flap, whereby when the closure flap is initially lifted, the plug will break away from the wall in which it is formed to define the dispensing opening and, upon reclosure of the closure flap, the plug will reenter the opening to thereby reclose the opening in a more positive fashion than if the opening were simply covered by the liftable flap.

The foregoing together with other objects of the invention which will appear hereinafter or which will be apparent to the skilled worker in the art upon reading this specification, we accomplish by that construction and arrangement of parts which we shall now describe in exemplary embodiment.

Reference is now made to the accompanying drawings wherein:

FIGURES 6, 7, 8 and 9 are fragmentary perspective views illustrating successive steps in the infolding of the liner and the closure flaps at one end of the flat-folded carton subsequent to its erection.

FIGURES 10 through 13 are perspective views illustrating successive stages in the filling of the carton, the sealing and folding of the remaining end of the liner, and the closing of the remaining closure flap, thereby completing the package.

FIGURE 14 is a fragmentary perspective view illustrating the carton structure in its position of ultimate use, with the liftable closure flap raised to expose the dispensing opening and the underlying portion of the liner.

Figure 1:
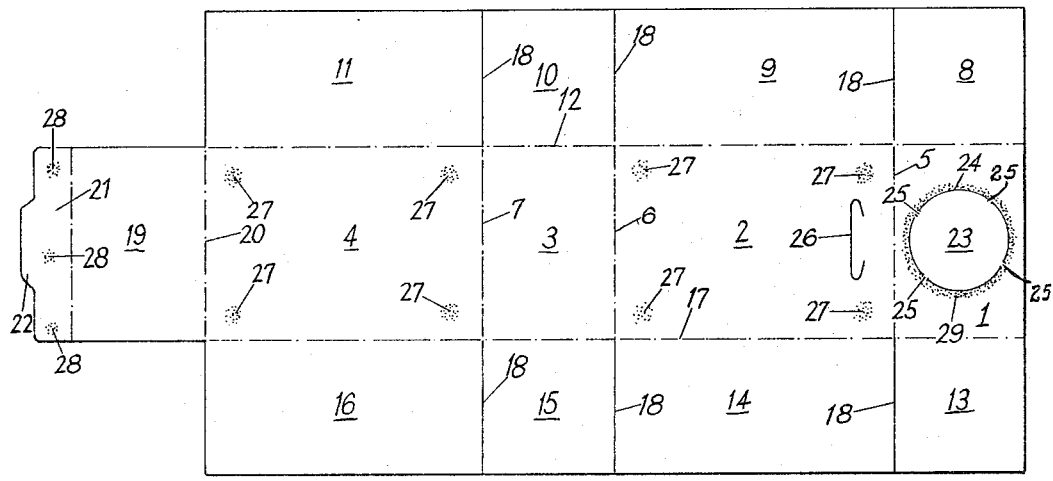
FIGURE 1 is a plan view of a paperboard blank cut and scored to define a carton in accordance with one embodiment of the instant invention.

Referring first to FIGURE 1 of the drawings, there is illustrated a first embodiment of the invention comprising a paperboard blank cut and scored to provide a series of body walls 1, 2, 3 and 4 articulated to each other along the lines of fold 5, 6, and 7, respectively. Closure flaps 8, 9, 10 and 11 are hingedly connected to the corresponding ends of the body walls 1, 2, 3 and 4, respectively, on the common line of fold 12; and similar closure flaps 13, 14, 15 and 16 are hingedly connected to the opposite edges of the said body walls along the common line of fold 17. The closure flaps are separated from each other by lines of cut 18. A liftable closure flap 19 is hingedly connected to the end edge of body wall 4 along the line of fold 20; and the liftable closure flap carries an attachment tab 21 having a tongue portion 22.

At the opposite end of the blank, a removable plug 23 is formed in the body wall 1. The plug is die cut from the wall along the opening defining line of cut 24, although it is retained in place by a plurality of narrow breaks 25 in the line of cut 24. A tongue receiving slot 26 is formed in the body wall 2.

The blank just described is adapted to be folded and glued using straight line folding and gluing equipment; and to this end it will be advanced through the folding and gluing equipment in the direction of the arrow A. As the flat blank is advanced, it will be contacted by suitable glue applicator means which will apply spots of adhesive 27 adjacent the corners of the body walls 2 and 4, with additional spots of adhesive 28 applied to the attachment tab 21. Preferably, a ring of adhesive 29 will be applied to the body wall 1 surrounding the removable plug 23.

Figure 2:
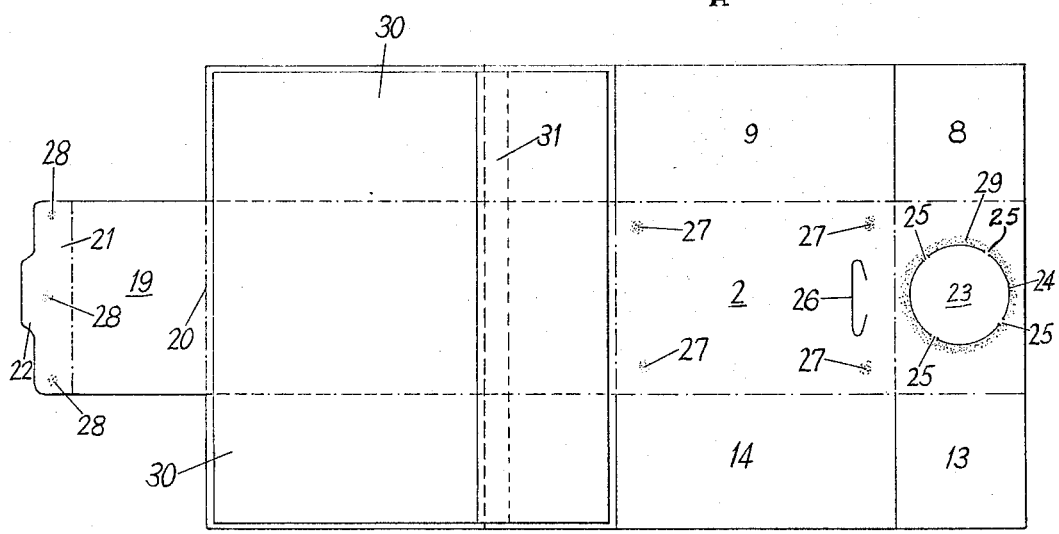
FIGURE 2 is a plan view similar to FIGURE 1 but showing a flat-folded liner juxtaposed on the blank.
Figure 3:
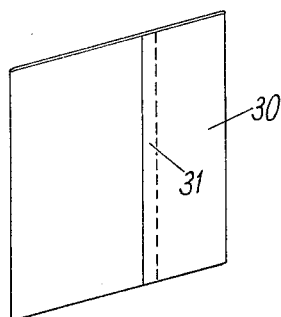
FIGURE 3 is a perspective view of a tubular liner structure which is sealed across one end.

Subsequent to the application of the adhesive, a liner 30 will be deposited on the body walls 3 and 4 in the position illustrated in FIGURE 2, with the undersurface of the liner adhering to the body wall 4 by means of the spots of adhesive 27. As best seen in FIGURE 3, the liner will preferably comprise a tubular body 30 formed from a proofing material. While the nature of the lining material does not constitute a limitation on the invention, it will be preferably formed from a flexible heat sealable material, such as polyethylene, or a similar non-fibrous film, or from a laminated web, such as paper coated with a heat sealable proofing coating. The liner normally will have a longitudinal seam, such as the seam 31, by reason of its being formed from a web of liner forming material. In this connection, the liner may be formed and associated with the flat carton blank in accordance with the teachings of Bergstein United States Patents 2,114,621 and 2,116,388 and as deposited on the carton blank the flat liner tube will be of a size such that its width will be substantially equal to the combined widths of the body walls 3 and 4, and its length will be such that its opposite ends will extend outwardly beyond the carton body walls so as to overlie the closure flaps 10, 11 and 15, 16, in the manner seen in FIGURE 2.

Figure 4:
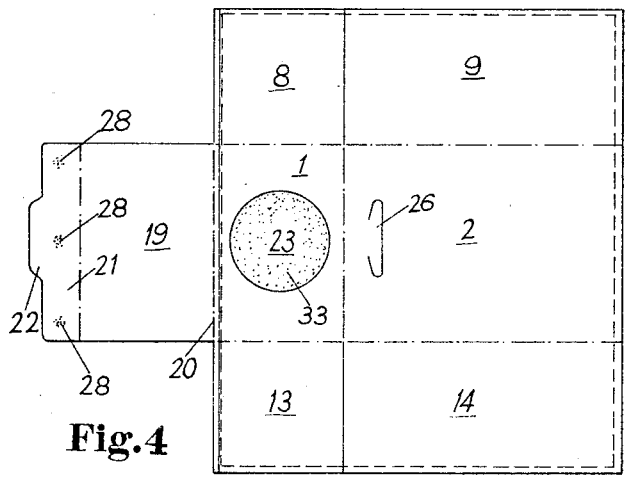
FIGURES 4 and 5 are plan views illustrating successive stages in the folding and gluing of the blank to define a flat-folded carton structure.
Figure 5:
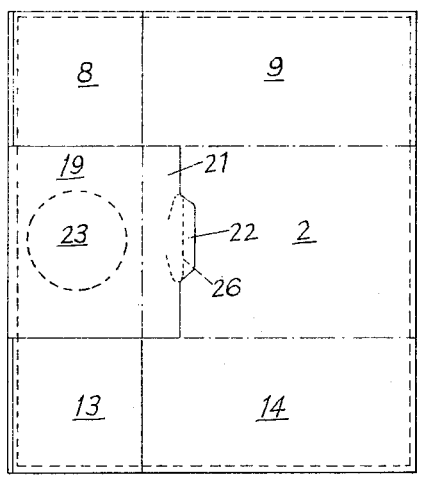

Referring now to FIGURES 4 and 5 of the drawings, as the blank is moved along the liner tube deposited thereon, the right hand portion of the blank will be infolded along the line of fold 6, thereby juxtaposing the body walls 1 and 2 and the closure flaps carried thereby on top of the liner. The adhesive spots 27 on body wall 2 will adhere to underlying portions of the liner, thereby effectively securing the liner to an opposite pair of the carton body walls. Adhesive 33 is applied to the uppermost surface of removable plug 23, whereupon the liftable closure flap 19 is infolded along line of fold 20. This results in the flap 19 being juxtaposed to body wall 1 with the removable plug 23 in the body wall 1 adhered to the overlying flap 19. The dimension of the parts is such that the attachment flap 21 will overlie the adjacent marginal portion of body wall 2 to which it is secured by means of the glue spots 28, the assembled carton and liner thus assuming the knock-down, flat-folded condition illustrated in FIGURE 5. It is to be noted in particular that the positioning of the liner relative to the body walls of the carton is such that the longitudinal seam 31 underlies the body wall 2 so that an uninterrupted portion of the liner tube will underlie the body 1 which has the dispensing opening formed thereon. It is in this condition that the carton structures will be shipped to the packager.

Figure 6:
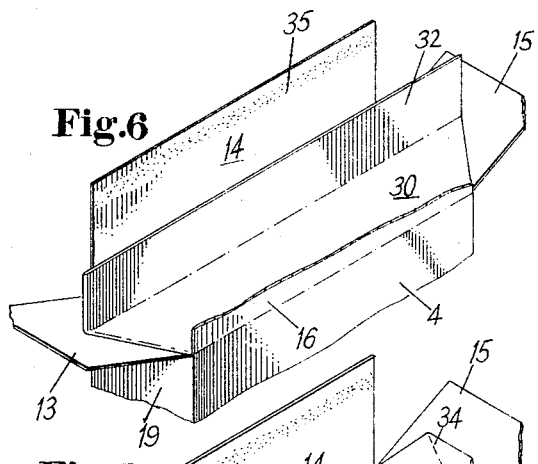
Figure 7:
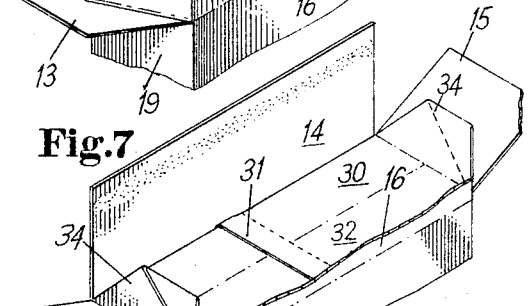
Figure 8:
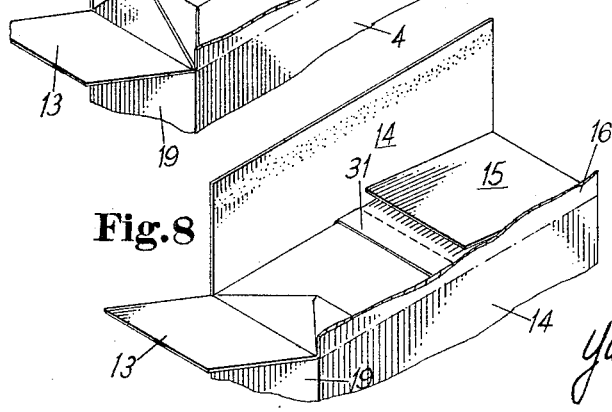

In the hands of the packager, the body walls of the cartons will be erected, and in so doing the liner will also be erected by reason of its attachment to the opposite body walls 2 and 4, whereupon one of the extending ends of the liner will be sealed across its open end to form an end seal 32, thereby bringing the parts to the condition illustrated in FIGURE 6, the sealed end of the liner will be next folded over to the position illustrated in FIGURE 7, thereby forming triangular tucks 34 at its opposite ends, which are then infolded along with the end closure flaps 13 and 15, in the manner illustrated in FIGURES 8 and 9. Adhesive is applied to the inner surface of flap 14, as at 35, whereupon the flaps 16 and 14 are infolded and sealed together to complete the closure.

The carton, which is now closed and sealed across one end of its tubular body, is then inverted to bring it to condition illustrated in FIGURE 10, in which condition the remaining unsealed end of the carton and liner are uppermost and in position for filling, as by means of the filling spout 36 which will serve to introduce the material to be packaged into the open end of the liner. Upon introduction of the desired quantity of material into the liner, the exposed open end of the liner is then contacted by a sealing means, such as the heated pressure rolls 37, which form an end seal across the remaining end of the liner. The end of the liner is then folded over in the manner illustrated in FIGURE 12, whereupon the closure flaps 8 and 10 are infolded, followed by the flaps 9 and 11, with the interposition of adhesive therebetween. The package is thus completely sealed and ready for distribution to the ultimate user. The just described sealing and folding of the liner and the folding and gluing of the closure flaps may be accomplished employing the equipment and procedures disclosed in Bergstein United States Patents 2,114,-624 and 2,166,389, Back United States Patent 2,550,506, and Bergstein and Back United States Patent 2,979,995.

While in most cartons the folded sets of closure flaps define the bottom and top ends of the package, in accordance with the instant invention the finished package is upended so that its upper end will be defined by body wall 1 and overlying liftable closure flap 19, with the sets of closure flaps 8, 9, 10, 11 and 13, 14, 15, 16 defining the opposite side walls of the carton. Thus, the tubular body wall 3 becomes the bottom wall of the package in its position of ultimate use, with any printed indicia on the carton extending crosswise of the wall 2, for example, in the manner diagrammatically illustrated at 39 in FIGURE 13.

In the hands of the user, the package is opened by breaking the adhesive seal between the attachment tab 21 and the underlying body wall 2. This may be conveniently done since the attachment tab will be adhered to the underlying body wall only in limited areas, as defined by the spots of adhesive 28. When the attachment tab is freed from the body wall, it may then be used to raise liftable closure flaps 19 which, as it is raised, carries with it the liftable plug 23 which is adhesively secured to the liftable closure flap. The plug will easily break away due to its attachment to the body wall 1 solely by means of the breaks 25. The parts thus assume the position illustrated in FIGURE 14, wherein it will be seen that a portion of the liner will be exposed through the dispensing opening defined by the cut line 25. Since the liner is adhered to the undersurface of body wall 1 by means of the ring of adhesive 29 surrounding the opening, the liner will be held taut and the user may cleanly sever the exposed portion of the liner about the periphery of the opening, thereby exposing the contents of the package. As already indicated, the orientation of the liner relative to the dispensive opening is such that neither its longitudinal seam 31 nor the end seals 32 and 38 will lie beneath the dispensing opening and interfere with the cutting of the liner. Yet when it is desired to reclose the package, the liftable closure flap 19 may be folded downwardly so that the removable plug 23 will reenter the opening 24, with the liftable closure flap retained in the closed position by means of the tongue 22 which will be engaged in the slot 26 in body wall 2.

From the foregoing, it should be apparent that the instant invention provides a simple yet highly effective canister type carton structure formed from a one-piece paperboard blank and a tubuluar liner, the structure being such that it may be readily fabricated using existing box making and handling equipment. The structure incorporates the advantages of a seal end carton insofar as its erection, filling and sealing is concerned; yet in the hands of the user, the package may be readily opened by means independent of the original end closures, with the raising of the liftable closure flap serving to expose an uninterrupted portion of the tubular liner which, by reason of its adhesive securement to the top wall of the carton, may be readily punctured and the liner cleanly removed in the area of the dispensing opening so that a spoon or the like may be inserted to remove the contents.

Figure 15:
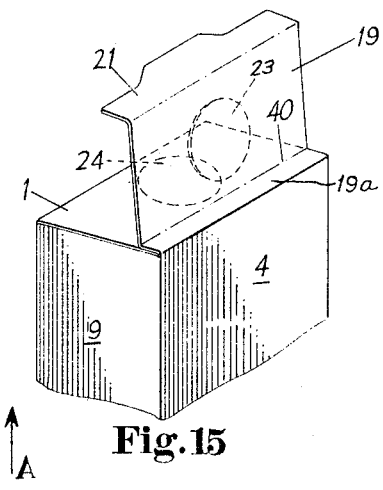
FIGURE 15 is a fragmentary perspective view illustrating a modification of the carton structure embodying a modified form of liftable closure flaps.

In the modification of the invention illustrated in FIGURE 15, the liftable closure flap 19 is provided with a line of fold 40 acting to define an attachment portion 19a to which adhesive will be applied so that when the carton is assembled, the attachment portion 19a will be adhesively secured to what is otherwise the free side edge of body wall 1, thereby effectively securing the edge of body wall 1 to adjacent body wall 4. This expedient serves to close an otherwise open edge along one side of the body wall 1.

FIGURES 16 through 21 illustrate an embodiment of the invention wherein the integral liftable closure flap is omitted, the pouring opening in body wall 1 being closed by a separate cover member.

Figure 16:
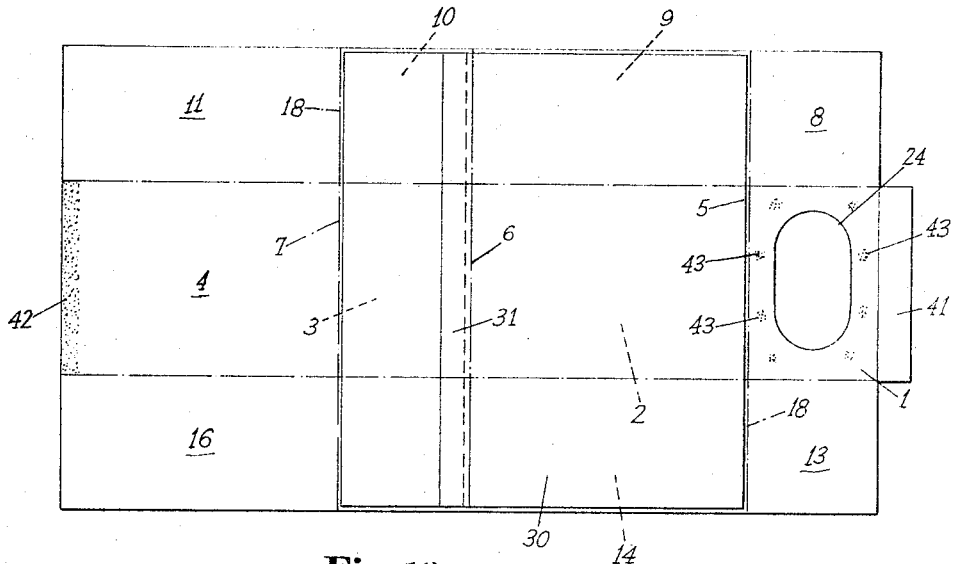
FIGURE 16 is a plan view of a paperboard blank and liner illustrating another modification of the invention.

The carton blank illustrated in FIGURE 16 is generally similar to the blank of FIGURE 1 and consequently like parts have been given like reference numerals. However, in this instance, the liftable closure flap and attachment tab are omitted and replaced by an attachment flap 41 hingedly connected to the outer side edge of body wall 1. It is also preferred to juxtapose the liner 30 to body walls 2 and 3 in the manner illustrated, with the tubing of the blank into knocked-down flat-folded condition accomplished by first infolding body wall 1 along with the parts articulated thereto, followed by the infolding of body wall 4. This serves to juxtapose the outermost marginal edge of body wall 4 on attachment flap 41; and to this end a stripe of adhesive 42 may be applied to the outer edge portion of body wall 4. Alternatively adhesive may be applied to the surface of attachment flap 41 opposite the surface thereof shown in FIGURE 16. As will be explained more fully hereinafter, the liner must be free to flex inwardly in the area of the dispensing opening, and consequently it is preferred that the liner be rather loosely adhered to the undersurface of body wall 1, as by means of the spaced apart spots of adhesive 43 which are spaced outwardly from the periphery of dispensing opening 24. In this embodiment of the invention, the portion of body wall 1 lying within the confines of the dispensing opening 24 will be removed as scrap prior to the fabrication of the carton blank into a knocked-down carton structure.

Figure 17:
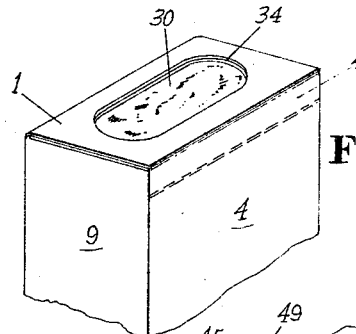
FIGURE 17 is a fragmentary perspective view of the erected and sealing carton blank of FIGURE 16.
Figure 18:
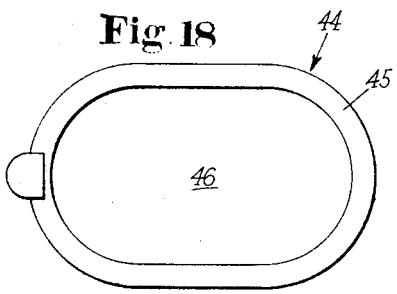
FIGURE 18 is a top plan view of a separate cover member for the dispensing opening in the carton shown in FIGURE 17.

The flat-folded carton structure will be erected, filled and sealed in the manner previously described, whereupon it will assume the condition illustrated in FIGURE 17 wherein it will be seen that a single thickness opening is provided in the body wall 1 which overlies the liner 30. This opening is adapted to be closed by the closure member 44 illustrated in FIGURES 18 through 20. The closure member has an annular flange 45 which surrounds and projects outwardly from a central body portion 46 which is recessed relative to the flange 45 so as to have an annular wall surface 47 the configuration of which corresponds to the configuration of the dispensing opening 24. The lower extremity of the annular wall is provided with a plurality of spaced apart, outwardly projecting lugs 48 which, when the cover member is fitted in the opening 24, engage beneath the edges of the opening to effectively lock the cover in place. It is also preferred that the cover member be provided with an integral lift tab 49 to facilitate its removal from the dispensing opening.

Figure 21:
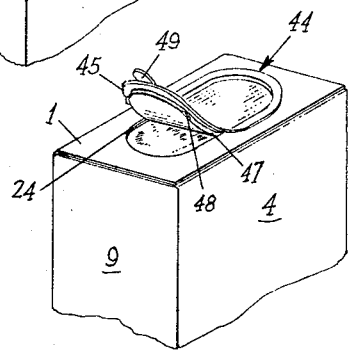
FIGURE 21 is a fragmentary perspective view illustrating the flexible character of the cover member as it is removed from the dispensing opening.
Figure 19:
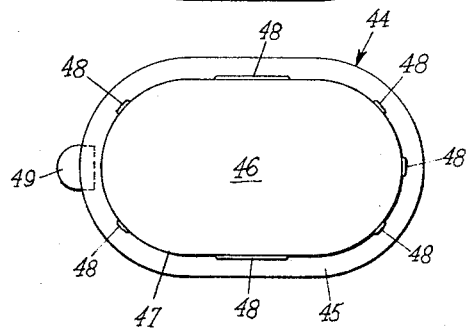
FIGURE 19 is a bottom plan view thereof.
Figure 20:
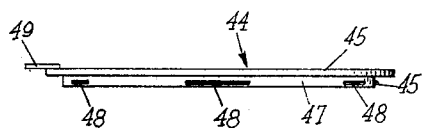
FIGURE 20 is a side elevational view of the cover.

The cover member is preferably formed from a flexible and readily bendable material, such as plastic, so that it may be flexed and bent as it is inserted and removed from the dispensing opening. This action is illustrated in FIGURE 21 of the drawings wherein it will be seen that the user may engage the tab 49 and literally peel the cover member from the dispensing opening. Such movement serves to readily disengage the lugs from beneath the edges of the opening; and in similar fashion the lugs may be readily re-engaged by pressing the cover member downwardly into engagement with the edges of the opening. It has also been found that the flexibility of the cover member permits it to conform to any slight irregularities in the surface of body wall 1, the nature of boxboard being such that when a relatively large opening is cut in the boxboard, the board tends to warp and bend slightly so that the top wall is not necessarily planar throughout.

As already indicated, the liner 30 is loosely adhered to the inner surface of body wall 1 at spaced apart points, thereby permitting the liner to be depressed inwardly. The purpose of this construction is to permit entry of the central body portion and annular wall surface of the cover member. If the liner were drawn taut across the opening, the aforementioned parts of the cover could not be readily inserted in the dispensing opening.

It will be apparent that modifications may be made in the invention without parting from its spirit and purpose. For example, while a longitudinally seamed liner is preferred due to the greater range of liner forming materials from which the liners may be fabricated, it should be evident that seamless tubular liners may be employed, as where the liner is composed of a seamless polyethylene tube. Similarly, it is possible to preseal one end of the liner tube as an incident of its formation, although where this is done, the subsequent erection of the carton and liner results in a twisting of the presealed end of the liner, which is not conductive to the formation of neat folds when the carton is closed and sealed. In the case of the embodiment incorporating a plug, it may be desired to scrap-out the plug prior to the assembly of the blank and liner, but if this is done the advantage of the plug is lost when the structure is reclosed. The separate closure plug may be formed from other than a flexible material if so desired, but here again the advantage of the flexible cover will be lost.

The embodiments of the invention in which an exclusive property or privilege is claimed are defined as follows:

1. A canister type container formed from a one-piece flat-folded carton blank having four body walls in edge to edge articulation defining, in the order named, the top, front, bottom and rear walls of said container, closure flaps projecting outwardly from the opposite side edges of said carton body walls, said closure flaps, when juxtaposed and adhesively sealed together, defining the opposite side walls of said container, a dispensing opening formed in the top wall of said carton body, a tubular liner disposed within said carton body with its opposite ends projecting freely outwardly beyond the opposite side edges of said carton body walls, said liner being adhesively secured to said carton body walls so that said liner will be erected together with said body walls whereby to provide a container which, upon erection, is adapted to be filled and sealed through its opposite side walls, whereupon the filled and sealed container is uprighted for use with the top wall containing the dispensing opening uppermost, a removable cover member for said dispensing opening, said removable cover member being of a size to completely cover said dispensing opening and having portions thereof projecting outwardly beyond the periphery of said dispensing opening, said extending portions being juxtaposed to the upper surface of said top wall, said removable cover member comprising a liftable closure flap hingedly connected to the upper edge of the rear wall of said carton body and of a size to overlie said top wall and the dispensing opening therein, said liftable closure flap having an attachment tab hingedly connected thereto, said attachment tab being detachably secured to the front wall of said carton body adjacent its uppermost end.

2. The container structure claimed in claim 1 wherein said dispensing opening is defined by a removable plug formed in said top wall and detachably connected thereto, said liftable closure flap being adhesively secured to said removable plug, whereby when said liftable closure flap is initially raised, said removable plug will be displaced from said top wall to expose the dispensing opening and the underlying portion of said liner, and upon reclosure of said liftable closure flap, said removable plug will re-enter said opening, said liftable closure flap having a line of fold therein paralleling the upper edge of said rear wall, said line of fold defining a narrow attachment portion immediately adjoining the rear wall of said carton, said attachment portion being adhesively secured to the top wall of said carton.

3. A canister type container formed from a one-piece flat-folded carton blank having four body walls in edge to edge articulation defining, in the order named, the top, front, bottom and rear walls of said container, closure flaps projecting outwardly from the opposite side edges of said carton body walls, said closure flaps, when juxtaposed and adhesively sealed together, defining the opposite side walls of said container, a dispensing opening formed in the top wall of said carton body, a tubular liner disposed within said carton body with its opposite ends projecting freely outwardly beyond the opposite side edges of said carton body walls, said liner being adhesively secured to said carton body walls so that said liner will be erected together with said body walls, whereby to provide a container which, upon erection, is adapted to be filled and sealed through its opposite side walls, whereupon the filled and sealed container is uprighted for use with the top wall containing the dispensing opening uppermost, a removable cover member for said dispensing opening, said removable cover member being of a size to completely cover said dispensing opening and having portions thereof projecting outwardly beyond the periphery of said dispensing opening, said extending portions being juxtaposed to the upper surface of said top wall, said removable cover member comprising a pre-formed member including a central body portion of a size to cover said dispensing opening and an annular wall surface of a size to engage the periphery of said dispensing opening, and means on said annular wall surface for releasably engaging the under-surface of said carton top wall adjoining the periphery of said dispensing opening.

4. The container structure claimed in claim 3 wherein said removable cover member is formed from a flexible plastic material.

5. The container structure claimed in claim 4 wherein the portion of said cover member projecting outwardly beyond the periphery of said dispensing opening comprises an annular flange surrounding the uppermost edge of said annular wall, and wherein the means engageable with the undersurface of the carton top wall comprises a plurality of spaced apart lugs projecting outwardly from said annular wall and lying in spaced relation to said annular flange.

6. The container structure claimed in claim 1 wherein said tubular liner has a longitudinal seam therein lying along one of said carton body walls other than said top wall so that a seam free portion of the liner will be juxtaposed to the dispensing opening in said top wall, and wherein said liner is adhesively secured to the under-surface of said top wall in an area immediately surrounding said top wall.

References Cited by the Examiner

UNITED STATES PATENTS

| | | | |
|---|---|---|---|
| 2,017,405 | 10/1935 | Pantalone | 229—39 X |
| 2,250,249 | 7/1941 | Bergstein | 229—14 |
| 2,296,896 | 9/1942 | Bergstein | 229—14 |
| 2,361,408 | 10/1944 | Moor | 229—14 |
| 2,363,861 | 11/1944 | Goodyear. | |
| 2,365,159 | 12/1944 | Walton et al. | 229—51 X |
| 2,493,337 | 1/1950 | Buttery. | |
| 2,583,211 | 1/1952 | Fleming | 229—51 X |
| 2,963,209 | 12/1960 | Hovland | 229—51 X |
| 3,104,793 | 9/1963 | Hicken | 229—17 |

JOSEPH R. LECLAIR, *Primary Examiner.*

FRANKLIN T. GARRETT, GEORGE O. RALSTON,
*Examiners.*

D. T. MOORHEAD, *Assistant Examiner.*